(12) United States Patent
Parkvall et al.

(10) Patent No.: US 10,574,420 B2
(45) Date of Patent: Feb. 25, 2020

(54) RESOURCE ALLOCATION SIGNALING

(71) Applicant: Telefonaktiebolaget LM Ericsson (publ), Stockholm (SE)

(72) Inventors: Stefan Parkvall, Bromma (SE); Robert Baldemair, Solna (SE); Daniel Chen Larsson, Lund (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/402,431

(22) Filed: May 3, 2019

(65) Prior Publication Data
US 2019/0260548 A1  Aug. 22, 2019

Related U.S. Application Data

(63) Continuation of application No. PCT/SE2017/050326, filed on Mar. 31, 2017.

(51) Int. Cl.
*H04L 12/28* (2006.01)
*H04L 5/00* (2006.01)
*H04W 72/04* (2009.01)
*H04J 1/16* (2006.01)

(52) U.S. Cl.
CPC ......... *H04L 5/0053* (2013.01); *H04W 72/042* (2013.01); *H04W 72/048* (2013.01); *H04W 72/0453* (2013.01)

(58) Field of Classification Search
CPC ............. H04W 72/042; H04W 72/048; H04W 72/0453
USPC ................. 370/252, 329, 389, 430
See application file for complete search history.

(56) References Cited

U.S. PATENT DOCUMENTS

| | | | |
|---|---|---|---|
| 2012/0087331 A1 | 4/2012 | Seo et al. | |
| 2013/0121278 A1* | 5/2013 | Noh | H04W 72/0453 370/329 |
| 2016/0006551 A1 | 1/2016 | Lee et al. | |
| 2018/0279289 A1* | 9/2018 | Islam | H04W 72/048 |
| 2019/0260530 A1* | 8/2019 | Yi | H04L 5/001 |
| 2019/0274122 A1* | 9/2019 | Golitschek Edler von Elbwart | H04W 72/1289 |

OTHER PUBLICATIONS

International Search Report and Written Opinion dated Nov. 27, 2017 for International Application No. PCT/SE2017/050326 filed on Mar. 31, 2017, consisting of 8-pages.

* cited by examiner

*Primary Examiner* — John Pezzlo
(74) *Attorney, Agent, or Firm* — Christopher & Weisberg, P.A.

(57) ABSTRACT

There is disclosed a method of operating a radio node in a Radio Access Network, the method including communicating utilizing frequency resources based on allocation information received in a message, the message having an allocation information structure containing the allocation information.

14 Claims, 8 Drawing Sheets

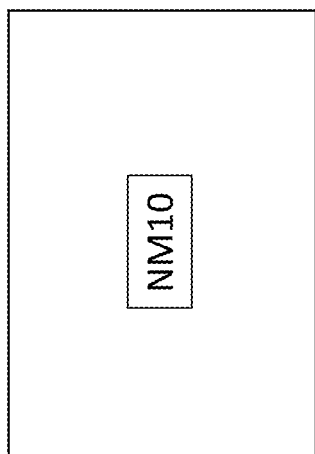

RESOURCE ALLOCATION SIGNALING

CROSS-REFERENCE TO RELATED APPLICATION

This application is a continuation of International Application No. PCT/SE2017/050326, filed Mar. 31, 2017, the entirety of which is incorporated herein by reference.

TECHNICAL FIELD

This disclosure pertains to wireless communication technology, in particular in the context of Radio Access Networks (RAN), e.g. for a 3GPP 5th generation (5G) standard like New Radio (NR).

BACKGROUND

Modern wireless telecommunication systems, e.g. according to NR, are capable of using wide frequency ranges for communication. A device communicating utilizing such a system will use a part of the frequency range/s for transmitting and receiving according to a resource allocation (or scheduled resources). Such allocation is usually signaled with control signaling. It is challenging to define consistent control signaling that is able to flexibly cover wide frequency ranges while having an acceptable level of signaling overhead.

SUMMARY

It is an object of the present disclosure to describe approaches of utilizing consistent allocation signaling with limited overhead over a wide range of frequencies, which at the same time allows flexible allocation of resources, in particular considering different allocation sizes. The approaches described herein are particularly useful in the context of NR Radio Access Technology/Networks (NR RAT/RAN). Thus, an allocating radio node or a network node may in particular a gNB (or eNB in some cases).

Accordingly, there is described a method of operating a radio node in a Radio Access Network. The method comprises communicating utilizing frequency resources based on allocation information received in a message, the message having an allocation information structure containing the allocation information.

Moreover, a radio node for a Radio Access Network may be considered. The radio node may be adapted for communicating utilizing frequency resources based on allocation information received in a message, the message having an allocation information structure containing the allocation information. The radio node may in particular be a user equipment or terminal, or more generally an allocated radio node, which may get resources allocated (configured) to it by another (allocating) radio node. Such an allocated radio node may for example be a relay node, or a booster node or secondary node, for example in a dual connectivity and/or heterogeneous network arrangement. The radio node or allocated radio node may comprise, and/or be adapted for utilizing, processing circuitry and/or radio circuitry, in particular a transmitter and/or receiver and/or transceiver, for communicating and/or receiving the message. Alternatively, or additionally, the radio node may comprise a communicating module for communicating and/or a receiving module for receiving the message.

Also, there is described a method of operating an allocating radio node in a Radio Access Network. The method comprises transmitting a message comprising allocation information, the message having an allocation information structure containing the allocation information. The method may also comprise determining the allocation information, e.g. based on and/or in the context of scheduling one or more (allocated) radio nodes, which may be performed by the allocating radio node or another node.

Generally, scheduling may be seen as a process in which resources are distributed for radio nodes and/or data streams (which may be associated to radio nodes). In the context described here, allocating may pertain to informing a radio node about resources scheduled for it, e.g. by transmitting the message comprising the allocation information.

An allocating radio node for a Radio Access Network may be considered. The allocating radio node is adapted for transmitting a message comprising allocation information, the message having an allocation information structure containing the allocation information. The allocating radio node may comprise, and/or be adapted for utilizing, processing circuitry and/or radio circuitry, in particular a transmitter and/or transceiver, for transmitting the message and/or determining the allocation information. Alternatively, or additionally, the allocating radio node may comprise a transmitting module for transmitting the message and/or a determining module for determining the message. The allocating radio node may in particular be a network node.

Allocation information may generally be considered a form of control information. The message may be a control information message and/or represent control signaling. In particular, the message may be implemented as Downlink Control Information (DCI) message, which may be considered to represent a downlink message containing control information, in particular for NR. The allocation information may be contained in a single message, e.g. for a single allocation occurrence. In some variants, it may be considered that the message is a system message (e.g., broadcast or multicast, for example in the context of random access or sidelink resource allocation), or a RRC or MAC (Medium Access Control) layer message. In the context of sidelink resource allocation, the allocation may indicate frequency resources available for one or more pools, e.g. discovery and/or communication pools.

An allocation information structure may generally indicate an arrangement of information, e.g. in the form of bits, representing the allocation information. The structure may indicate the meaning and/or how to interpret and/or to decode the bits to provide or retrieve the allocation information.

It may be considered that the allocation information structure comprises a header containing header information and a bitmap containing mapping information. Header information and mapping information may be considered allocation information.

The header information may indicate a type of resource grouping used for allocation, and/or a location in a bandwidth or bandwidth representation to which the allocation information, in particular the mapping information, pertains. The header information may lead the mapping information, e.g. to facilitate correct coding or decoding. However, any order or distribution of header information and mapping information in the message may be used, considering the order is defined and known, e.g. pre-defined and/or configured, to the radio node and/or the allocating radio node.

A location may indicate a part of the bandwidth of a specific size, and may in some variants be continuous in frequency or discontinuous (split in frequency). The size may correspond to the Wth part of the total bandwidth/ representation thereof (1/W of the bandwidth). W may correspond to the size of largest resource grouping type considered divided by the size of the resource grouping type used for allocating (e.g., indicated by the header information). The resource grouping type and the largest resource grouping type may be elements of a set of resource grouping types.

Allocation information pertaining to a location may be considered to be information indicating which resource groupings of the type indicated in the header information within the location are allocated (or not allocated) for communicating for the radio node. The groupings may be allocated, e.g., according to the mapping information, for example a bitmap. In particular, each bit of the bitmap may be mapped to (e.g., a different) one of the groupings in the location, indicating whether the resources in the resource grouping are allocated.

According to approaches discussed herein, the part of the bandwidth allocatable with a single message may scale with the size of the resource grouping addressed, however the granularity may increase (corresponding to decreasing resolution) on the same scale.

Header information may generally be considered to indicate a combination of location and associated resource grouping type, e.g. according to a prescribed (e.g., pre-defined or configured or default) scheme of associating location and types. Such a scheme may for example represented in a table, e.g. a table similar to table 1. Multiple locations may be associated to a resource grouping type, in particular W locations to a type (with W varying for types of different size). It may be considered that the set of resource grouping types is represented by a set of locations, which may in particular represent all the locations (parts of the bandwidth) allocatable and/or addressable by the resource grouping types associated to the set. Each location of the set may be represented by a bit combination of the header. The type may be implicitly linked to the bit combination or order of locations. A table mapping location (and implicitly or explicitly type) to a bit combination of the header information may be considered. The table may be available, e.g. pre-defined or configured and/or stored in memory, for the radio node or the allocating radio node (respectively circuitry thereof), e.g. for determining or decoding the allocation information.

It may be considered that additionally, header information may comprise a representation indication indicating whether (e.g., one bit) and/or which (e.g., multiple bits) bandwidth representation the allocation information pertains to, and/or which mapping is to be used to map the representation to the (physical) bandwidth.

The frequency resources may generally be comprised in a bandwidth, which may be a carrier bandwidth and/or system bandwidth and/or user equipment bandwidth. The carrier bandwidth may be the bandwidth of the carrier to be used for communicating, which may be an uplink or downlink carrier. The system bandwidth may be the bandwidth (e.g., on the carrier) the allocating radio node, and/or the RAN) may utilize and/or be adapted or configured for utilizing. A user equipment (UE) bandwidth (or, more generally, a radio node bandwidth), may be the bandwidth a radio node/user equipment is adapted and/or configured to use, e.g. according to its radio circuitry and/or according to a configuration. The UE bandwidth in some variants may be smaller than the system bandwidth and/or carrier bandwidth, e.g. due to limitation on circuitry of the UE. Similarly, the carrier bandwidth may differ from the system bandwidth, for example due to limitations on circuitry and/or according to operational conditions. The bandwidth may generally be the bandwidth allocated for communicating and may be referred to as total bandwidth. It should be noted that this does not necessarily mean that the whole bandwidth is allocated to one radio node, or even to more than one radio node, but that frequency resources within the bandwidth are allocated. The bandwidth may represent the bandwidth available for communicating on the associated carrier and/or for the system and/or UE or radio node. Differences in the bandwidth types may be corrected for in control signaling, in particular the allocation information, e.g. by not allocating certain resources not available for a radio node or UE.

Generally, the frequency resources may be comprised in a bandwidth, the bandwidth consisting of a number L of bandwidth elements (L may be larger than 1, and may e.g. be 100 or more). The bandwidth elements may cover a frequency interval around a central frequency, and/or be associated to specific frequencies and/or subcarriers. The bandwidth elements may be non-overlapping and/or continuous (both may be considered for the physical bandwidth, for virtual representations, the bandwidth elements may at least be non-overlapping). The frequency resources and/or bandwidth may generally be allocated for uplink transmission, or downlink transmission (to be received by the radio node), or sidelink communication. In some cases, the resources and/or bandwidth may be allocated for two-directional communication, e.g. for some Time Division Duplex (TDD) Cases, or when sharing a large bandwidth for Frequency Division Duplex (FDD).

Generally, the allocation information structure may comprise a header for header information, the header information indicating at least one resource grouping type to be allocated. The header information may indicate exactly one resource grouping type. Allocation may be such that frequency resources are allocated in grouping/s of the indicated size. Alternatively, or additionally, the header information may indicate a location of the indicated resource grouping or resource grouping type in frequency domain and/or inside the bandwidth or bandwidth representation. This may be relative to the part of the bandwidth or representation the resource grouping may cover. A location may represent a frequency interval corresponding to the size of the resource grouping allocated. Locations (possible locations) for a resource grouping of a given type may be non-overlapping in frequency domain. For example, for a resource grouping covering a quarter of the bandwidth representation, there may be considered 4 possible locations, which may be arranged successively in frequency domain such that they do not overlap (e.g., only touch at frequency borders if at all).

Generally, the header may be determined based on allocation size (e.g., total size or number of resources, e.g. elements or blocks) to be allocated, and/or operational conditions, and/or channels to be allocated for. Determining allocation information may comprise determining header information, and/or determining a bitmap as described herein. The details of scheduling resources may be left for implementation at an allocating radio node or scheduler.

Different resource groupings may in general have different sizes (referred to as, e.g., R), in particular in frequency domain. The size (in frequency domain) of a resource grouping (and/or its associated type) may be indicated by the associated frequency interval, and/or by the bandwidth elements and/or subcarriers and/or resource elements) it contains.

There may be considered a set of resource groupings or resource grouping types, which may comprise two or more of bandwidth element, bandwidth block, one or more bandwidth block group/s. The set may be predefined, e.g. according to a standard, and/or configured, e.g. by an allocating radio node or another network node. In some variants, the set may be configurable, such that e.g. at different times different sets underlie the resource allocation information.

It may be considered that generally the allocation information may pertain to frequency resources grouped in resource groupings of a specific resource grouping type, the type being one of bandwidth element, a bandwidth block comprising a plurality of bandwidth elements, and a bandwidth block group comprising a plurality of bandwidth blocks.

The header information may select and/or indicate one grouping type out of a set of resource grouping types. The header may have a size (in bits), which may be determined based on, and/or defined by, and/or be at least, the minimum number of bits needed to represent the number of elements of the set of resource groupings, and/or the number of possible locations (in the bandwidth/frequency domain) of the groupings in the set. The size of the largest resource grouping of the set may be referred to as Rmax. In some cases, the largest resource grouping of the set may cover the (total) bandwidth (in frequency). The size of the smallest resource grouping of the set may be referred to as Rmin. The smallest resource grouping may represent a block, in particular a resource block. However, in some variants the smallest resource grouping may represent a bandwidth element. Any resource grouping having a size smaller than Rmax, may be referred to as subgroup, in particular if it has a size larger than Rmin. The size of an allocation may be represented by the bandwidth or resource elements allocated for communicating to a radio node, e.g. by the message. Depending on use case, allocation sizes in particular for NR may vary over several magnitudes.

It should be noted that there may be different (bandwidth) block group types defined, with different sizes. The size of a bandwidth block group may be indicated by the number of bandwidth elements and/or number of bandwidth blocks it comprises. A bandwidth element may be represented by a subcarrier and/or resource element. A bandwidth block may be represented by a block of subcarriers and/or a resource block. A block may generally comprise a plurality of elements (e.g., a bandwidth block, bandwidth elements, a resource block, resource elements). A block group may generally comprise a plurality of blocks, e.g. a resource block group may comprise a plurality of resource blocks, etc.). The size of a block (e.g., in terms of elements in the block) may be predefined, e.g. according to a standard and/or a default setting, and/or configurable and/or configured, e.g. by a radio node, in particular a network node.

Different types of groupings in a set of groupings or grouping types may have sizes relating to each other according to a power-law, e.g. $K^P$, wherein K and P may be integers. K may in particular be 2. P may be 0 for a bandwidth element, and larger than 0 for other groupings/grouping types. However, there may be considered cases in which the smallest type of grouping in the set of groupings has a size (fixed and/or configured or configurable) of A bandwidth elements, e.g. a block. Different block groups may follow a power-law as indicated herein, wherein K then may pertain to the number of bandwidth elements and/or the blocks in the groups. In some variants, there may be power-laws with different K-values for different block groups. A set of groupings may be ordered or orderable by size. In such a view, a set of groupings may include all possible types of groupings according to the power-law having sizes between sizes of the maximum size block group and a minimum size grouping, e.g. a bandwidth element or bandwidth block. However, there may be variants in which not all possible sizes according to the power-law are present in the set. Generally, the size of a resource grouping may be considered to be the same as the size of an associated type of grouping. A set of resource groupings or types may be determined such that they form layers of different sizes determined by a power-law from layer to layer (the layers being ordered by size).

In some variants, the allocation information structure may comprise a bitmap for mapping information, the mapping information mapping one or more resource groupings to a bandwidth representation. The one or more resource groupings may be of a resource grouping type of a set of groupings, as e.g. indicated by header information contained in the message.

A bandwidth representation may represent the physical bandwidth, or a virtual representation of the physical bandwidth. In this latter case, utilizing the frequency resources may be based on mapping the bandwidth representation to the physical bandwidth. With a suitable bandwidth representation, frequency diversity and/or hopping may be arranged. The bandwidth representation may be configured or configurable, and/or be time-dependent. The bitmap for mapping information may be in addition to a header as described herein, and/or may follow such a header.

The allocation information, in particular a bitmap, may indicate which grouping/s is/are allocated for communicating, and/or which is/are not. The bitmap may have a size B (in bits), which may be defined by ceil(N/R). Generally, to each allocatable and/or addressable grouping, there may be associated one bit, which may indicate whether the grouping is allocated or not. N may be the number of groupings of the smallest grouping type (of size Rmin, e.g. for a bandwidth block or resource block or an element) of the set of grouping types required to cover and/or to define the (total) bandwidth. R may be Rmax of the set. The bitmap may be considered to map a 1/W part of the bandwidth for a grouping type having 1/W of the size of the largest grouping type (wherein W may in particular be a power of 2, or more generally, of K).

It may be considered that the allocation information structure may comprise a header having M bits and/or a bitmap having B bits. M may be selected to represent, and/or to comprise at least enough (or exactly enough) bits to represent, the number of possible groupings, and/or to represent, and/or to comprise at least enough (or exactly enough) bits to represent, the number of possible locations of all groupings of a set of resource groupings used for allocation signaling as described herein, or in some variants to represent both independently. B may be selected to comprise at least enough bits to represent the (e.g., minimum) number of groupings of the type with the largest size needed to cover the allocated bandwidth.

A location may generally be considered to represent a specific part of the bandwidth/representation in which resource groupings are allocated. Accordingly, a location may represent a part of frequency space, which may be continuous or non-continuous (e.g., split, having gaps in frequency). This part may be the total bandwidth for the largest sized grouping type, to smaller parts of the bandwidth for smaller size groupings. To each possible location (respectively associated bit representation) there may be associated a type of grouping and/or a grouping type of specific size. With B bits in the bitmap, B resource groupings in a location may be addressed or allocated, such that depending on the size of the groupings as indicated by header information, a location covering a specific part of the bandwidth or bandwidth representation may be allocated.

A set of resource groupings, and/or which groupings are in a set, and/or the maximum size of a grouping type or grouping in the set (Rmax), and/or the minimum size (Rmin), and/or the number of groupings in a set, may be determined based on the bandwidth and/or associated carrier frequency and/or numerology and/or spacing, and/or the direction of communication and/or the type of communication (e.g., waveform, in particular OFDM or SC-FDM), and/or the allocation size. Any one or any combination of these set-related (or grouping-related) parameters may be pre-defined, e.g. according to a standard, and/or configured or configurable (e.g., within pre-defined options). Accordingly, the radio node and/or the allocating radio node (respectively the scheduler or scheduling network node) may, determine and/or detect such parameter/s based on available communication parameters, such that for example no explicit control signaling may be necessary, and/or higher-level control signaling, e.g. on the RRC layer (Radio Resource Control layer), and/or control signaling during random access may suffice, which is usually transmitted less often than in particular DCI messages.

Allocation information may be valid for a given time interval, e.g. a slot and/or subframe and/or mini-slot and/or physical representation of a transmission time interval. Allocation information indicating allocation of resources for downlink (implying reception by the radio node) may be in the time interval comprising the allocated resources. In some variants, this may be also valid for uplink allocation, however in many cases, uplink allocation may pertain to a time interval after the time interval the allocation information is received.

In general, the allocation information may be considered to allocate frequency resources of a bandwidth to a radio node for communicating. Communicating may comprise transmitting (e.g., uplink or sidelink) and/or receiving (e.g., downlink or sidelink), according to the allocation information. Communicating utilizing frequency resources may comprise transmitting on frequency resources allocated for transmitting, and/or receiving (and/or expecting to receive) on frequency resources allocated for receiving. It should be noted that allocating may comprise a time domain component, which is not specifically handled here, but may be indicated in allocation information and/or the message. Communicating may be based on receiving and/or decoding the allocation information, and/or identifying the allocated frequency resources.

A program product comprising instructions causing processing circuitry to control and/or perform any one of the methods described herein is also disclosed.

Moreover, there is disclosed a carrier medium arrangement carrying and/or storing a program product as disclosed herein.

The allocation information may generally have a structure as indicated in one of the examples described herein.

A bandwidth representation may generally represent a virtual or physical (frequency) bandwidth. A virtual bandwidth may be mapped or mappable to the physical bandwidth in an unambiguous and/or unique and/or well-defined manner, e.g. based on a bandwidth representation map, which may be configured or configurable. A bandwidth representation may fully represent the physical bandwidth, in particular such that all its frequencies are represented, e.g. such that frequency interval (e.g., specific groupings associated to such intervals) represent physical intervals of the same size (in frequency domain). The mapping between a representation and the physical bandwidth may be continuous, in particular from one continuous frequency interval (e.g., comprising bandwidth elements arranged in order according to frequency) to another continuous frequency interval, the (physical) bandwidth. However, the mapping may be such that it is non-continuous, such that (at least for some) continuous frequency intervals and/or neighboring groupings (having no gaps between them) of the representation may be mapped to distributed and/or non-continuous and/or not neighboring groupings of the physical bandwidth. It should be noted that a physical bandwidth is a representation of itself, and/or may be represented based on an isomorphic continuous mapping (which may be without topological holes).

It should be noted that resource groupings as indicated by allocating information may be associated to specific frequency ranges, with defined lower and/or upper frequencies boundaries, and/or at least in relation and/or within the bandwidth (e.g., in relation to a lower end of the bandwidth and/or upper end of the bandwidth, if not specifically to a frequency), whereas resource grouping types may generally refer to frequency intervals having a given size (in frequency domain, e.g. a width or range).

Communicating utilizing frequency resources may generally comprise mapping allocation information to physical frequency/ies.

The frequency resources utilized may be considered allocated resources. A frequency resource may generally be represented by a resource grouping.

The approaches described herein allow resource allocation over a wide range of bandwidths and with scalable granularity (depending on the size of the group type allocated), with a consistent approach to the allocation information structure.

A bandwidth element may represent a (frequency) bandwidth or a frequency spectrum, respectively a part thereof. A bandwidth element may be continuous in frequency domain, e.g. representing a frequency interval, for example an interval of a specific size. Generally, a bandwidth element may generally be considered a representative of a bandwidth in any part of the frequency spectrum. However, a bandwidth element may be associated to a frequency or a carrier, for example the frequency or carrier may represent a central or representative frequency for a bandwidth including the bandwidth element. A bandwidth may comprise and/or consist of one or more bandwidth elements. In general, a bandwidth element may be considered the smallest addressable frequency interval of a bandwidth, e.g. addressable for use as a resource, and/or addressable for signaling. Different bandwidth elements may have different widths (in frequency). The width of a bandwidth element may be dependent on the carrier or frequency associated to it, and/or a bandwidth spacing (e.g., subcarrier spacing) and/or a numerology used for the associated frequency or bandwidth. In some variants, for a given frequency or carrier (or numerology or spacing), respectively an associated bandwidth, the bandwidth elements comprised therein or associated thereto may have the same width. A bandwidth element may be represented by a subcarrier or a resource element (respectively, the frequency domain component thereof, which may correspond to a subcarrier).

Several types of (bandwidth) groupings are described herein. A grouping may refer to a single element (e.g., bandwidth or resource element), or a block, e.g. a block of elements, wherein the block may cover a frequency range or interval corresponding to a plurality of elements, or a block group, comprising a plurality of blocks. Wherein the block group may cover a frequency range or interval corresponding to a plurality of block, respectively the associated elements. The frequency interval covered by each of these groupings may in some cases be continuous, in particular pertaining to a bandwidth representation.

However, in cases in which the bandwidth representation corresponds to a non-continuous mapping of grouping/s to (physical) bandwidth, the interval/s may be discontinuous/distributed within the bandwidth.

A message containing allocation information may be considered a form of allocation signaling (or control signaling).

BRIEF DESCRIPTION OF THE DRAWINGS

The drawings are provided to illustrate concepts and approaches described herein, and are not intended to limit their scope. The drawings comprise:

FIG. 5, showing an algorithmic diagram of an exemplary method of operating a radio node;

FIG. 7, showing an algorithmic diagram of an exemplary method of operating an allocating radio node; and FIG. 8, showing an exemplary allocating radio node.

DETAILED DESCRIPTION

Figure 1:
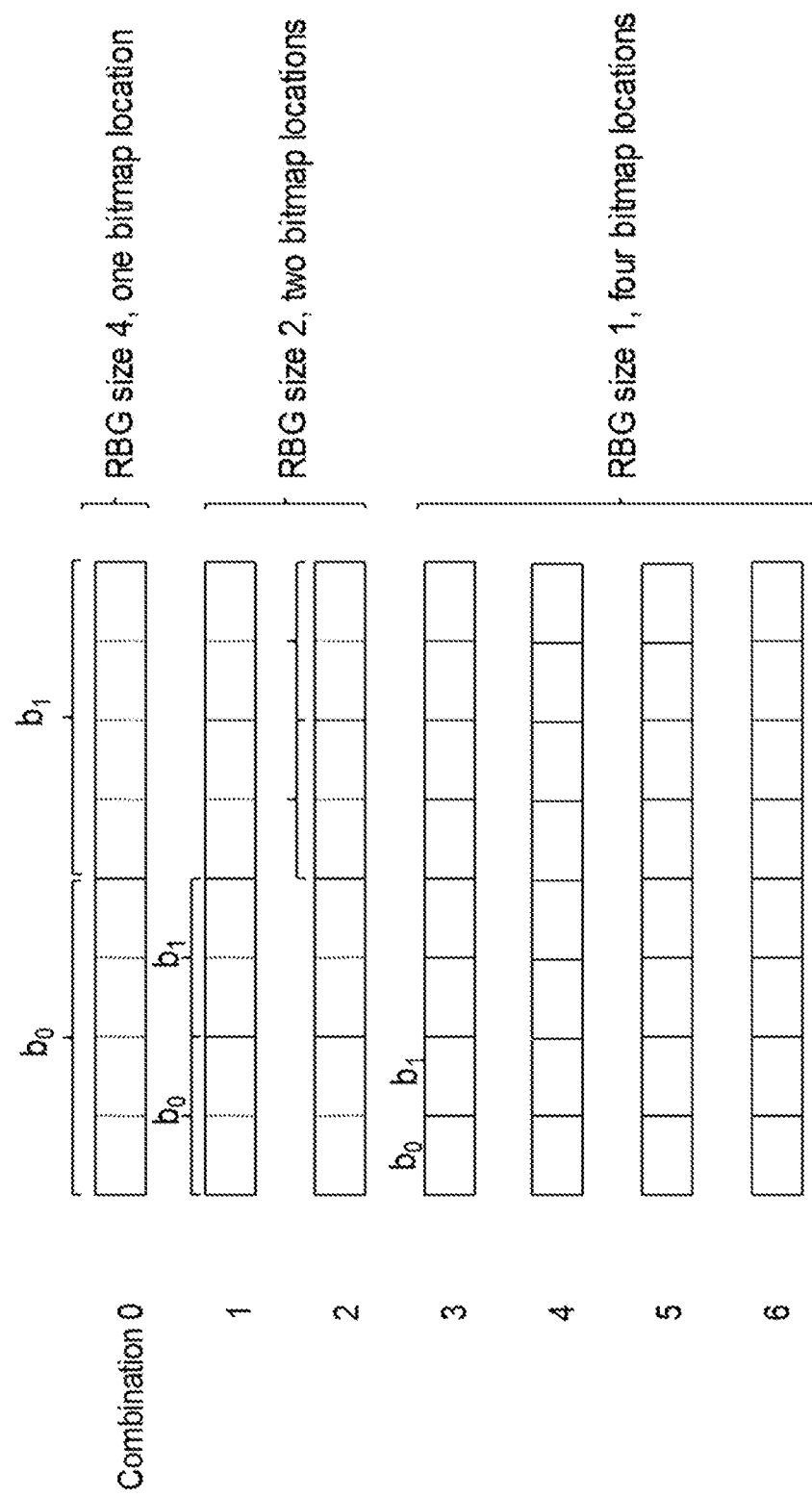
FIG. 1, showing an example of RB allocation for R=4 and B=2.

There are described approaches coupling the resolution of the bitmap for allocating resource groupings to the allocation size (size of the grouping) such that, for small allocations, it is possible to indicate individual blocks (or even elements) like RBs (or REs), while for larger allocations the bitmap refers to larger grouping, like block groups, e.g. RBGs. Accordingly, efficient usage of limited DCI resources is provided, and consistent usage of allocating signaling may be facilitated.

An example is described, with the following assumptions
  a total bandwidth (which the UE is capable of or configured to receive or transmit upon) of N resource blocks (RBs) is provided;
  an (maximum) resource-block-group (RBG) size of R (Rmax) with R (Rmax) being a power of two (this could for example be derived from the UE or system bandwidth or carrier bandwidth); in this context it should be noted that, if the value of the bandwidth that is assumed is derived based on what the UE is configured for (e.g., UE bandwidth), the value of R may change based on the configuration of the value. Further, the UE could also assume different values of R with different DCI messages, as not all messages would potentially be able to address the full BW that the UE can be allocated. It should also be noted that the value could be different in UL and DL. It could further be different in UL based on which wave form is used, i.e. if CP-OFDM or SC-FDM is utilized.
  a 'header' of M bits
  a bitmap of B bits To be able to address all the resource groupings, e.g. resource blocks respectively RBGs, a bitmap B=ceil(N/R) is provided, in particular there is one bit for each resource block, grouping or group. In this example, resource element-based allocation is disregarded. It should be noted that the frequency components of the resource blocks discussed represent bandwidth resource blocks.

The resource allocation is signaled to the UE using the size-M header followed by the size-B bitmap, in total M+B bits. The resource allocation is transmitted in a message, e.g. a DCI message.

In the following, it is referred to RBs and RBGs. However, these terms are merely intended to represent groupings like bandwidth blocks and resource block groups, and may be interchanged correspondingly.

The meaning/decoding of the resource allocation message can be described using a table, constructed along the following lines:

1. One entry where the size-B bitmap refers to RBGs of size Rmax (which may be assumed to cover the total bandwidth if all are allocated);

2. Two entries where the size-B bitmap refers to RBGs of size Rmax/2;
  a. the bitmap can address RBs or RBGs in half of the total bandwidth, hence two entries are need, one for each half of the total bandwidth (there are two possible locations);

3. Four entries where the size-B bitmap refers to RBGs of size R/4 (having 4 possible locations)
  a. the bitmap can address RBs in a quarter of the total bandwidth;

4. Eight entries where the size-B bitmap refers to RBGs of size R/8

5. ( . . . and so on until . . . )

6. R entries where the size-B bitmap refers to RBGs of size R/R, i.e. individual RBs The steps above can easily be described as a general algorithm, for example as 1. Let n=0
2. Append $2^n$ rows to the table where, for each of the $2^n$ rows, the bitmap refers to RBGs of size $R/2^n$ and the rows relate to different (non-overlapping) subgroups of RBGs
3. n=n+1
4. If $R/2^n \geq 1$ go to 2 (the algorithm could also be stopped earlier, e.g. $R/2^n \geq 2$ or $R/2^n \geq 4$, if there is no need to support individual RBs or pairs of RBs)

In step 2, the subgroups could be
  All RBGs for n=0
  Left half and right half for n=1. Alternatively, even and odd RB or
  RBGs (representing discontinuous locations).
  First, second, third, fourth quarter of RBGs for n=2. Alternatively four different comb-4 with offsets 0, 1, 2, and 3 (also representing discontinuous locations. Other variants may be considered. A table mapping locations (or locations and type) to a bit combination may be determined and/or defined and/or represented accordingly. The table may be indexed and/or mapped to by header information.

An example for Rmax=8 is given in Table 1. In FIG. 1, an example for Rmax=4, B=2 is given. For an LTE-like example of N=100 and Rmax=8, the bitmap would be of size 13 and the header of size 4, i.e. in total 17 bits. This setup would allow allocations from a single RB up to all 100 RBs.

RB subgroups (which may be groups of different sizes) may be contiguous or continuous in frequency, e.g. two neighboring resource blocks or groups may be located next to each other in the physical frequency domain (this may refer to a location, or in some cases, at least to the physical frequency domain). In some variants, it may be useful to improve the amount of frequency diversity, e.g. for some smaller allocations. This may for example be achieved by using locations split in frequency.

It may be considered that the RBGs or RBs in the description above could refer to virtual resource blocks or groups, and a virtual-to-physical mapping function could be used to describe the physical location. It may generally be considered that the frequency resources, respective the groupings indicated by the allocation information, may pertain to a bandwidth representation, which may a virtual representation. A bit in the header could indicate whether the RB allocation refers to physical or virtual resource blocks (or in the general case, multiple bits to describe multiple virtual-to-physical RB mappings). Alternatively, the mapping may be configured separately, e.g. with higher layer signaling like RRC signaling or MAC signaling.

Figure 2:
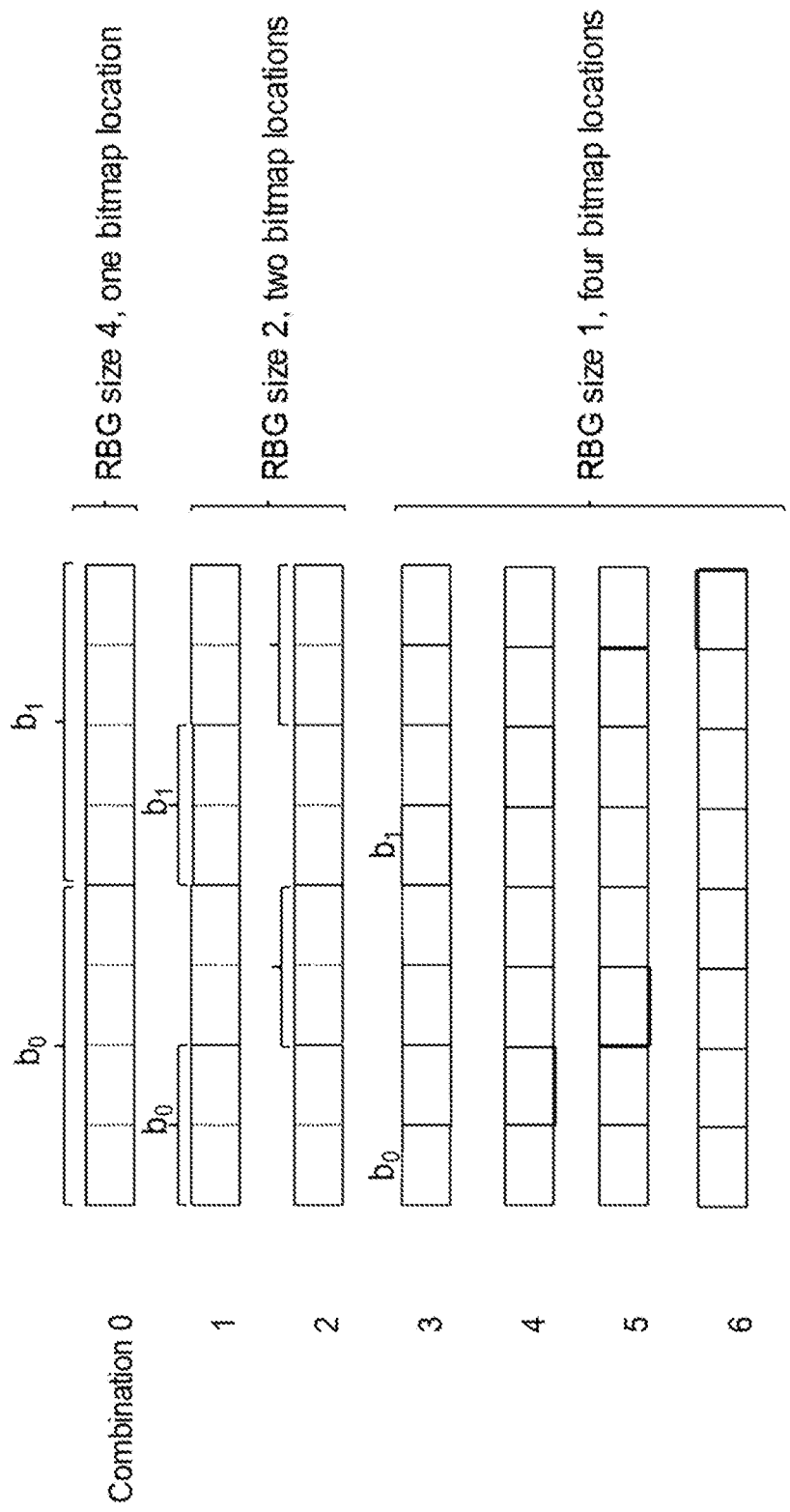
FIG. 2, showing another example of RB allocation for R=4 and B=2.

Additionally, or alternatively, groupings, at least groupings of selected sizes and/or locations may be non-contiguous (or non-continuous), as shown in FIG. 2. In this case, the header information may comprise one or more extra bits to indicate whether contiguous/continuous (FIG. 1) or non-contiguous/non-continuous (FIG. 2) groupings like RBGs are assumed. If no such extra bit is provided, the specification of a standard (pre-defined), and/or a configuration (e.g., higher layer configuration like RRC or MAC) may indicate if the subgroups indicate virtual RBs or groupings, and/or localized physical RB (FIG. 1), and/or distributed physical RB (FIG. 2).

If in above pseudo code the termination criteria "If $R/2^n>1$" is replaced by If "$R/2^n>2^L$" the lowest RB granularity would be $2^L$ and not 1. Alternatively, the granularity could refer to a bandwidth element as smallest grouping (instead of a block). In a further alternative, the block size (smallest grouping) may be configured and/or configurable, providing a large flexibility.

Above algorithm is described assuming that the PRB granularity is in the form $2^L$. However, the algorithm can be applied if RBG sizes are based on another power, $K^r$.

TABLE 1

Example of header sizes for R = 8.

| Number of combinations | RBG size | Number of bitmap locations | Resolution |
|---|---|---|---|
| 1 | 8 | 1 | 8 RBs |
| 2 | 4 | 2 | 4 RBs |
| 4 | 2 | 4 | 2 RBs |
| 8 | 1 | 8 | 1 RB |

Total   15 (4 bits header)

The resolution of allocation information (the bitmap) may be defined by the size of the grouping used, which may be considered to represent the allocated size for each bit of the bitmap.

A method of operating an allocating radio node like a gNB or enB may comprise, and/or such a node may be adapted for, configuring one or more radio nodes (in particular UE/s) so that each UE has an aligned starting position of its allocated bandwidth (BW) based on RBG size of the largest RBG size (size of the largest grouping of the set) within the allocated BW part.

Signaling to setup which BW a radio node like a UE could be operating on (e.g., uplink signaling indicating the UE bandwidth, and/or control signaling configuring a carrier and/or system bandwidth and/or a UE bandwidth) may be based on the largest RBGs size (generally, Rmax of the largest grouping), e.g. utilized from one of the system bandwidth edges or a subcarrier within the BW, in particular the system BW. The subcarrier could for example be given by the SS block.

Figure 3:
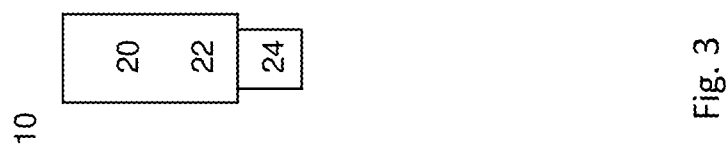
FIG. 3, showing an exemplary radio node.

FIG. 3 schematically shows a radio node or terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a transmitting module or receiving module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein. Radio node 10 may generally be adapted to carry out any of the methods of operating a radio node like terminal or UE disclosed herein; in particular, it may comprise corresponding circuitry, e.g. processing circuitry, and/or modules.

Figure 4:
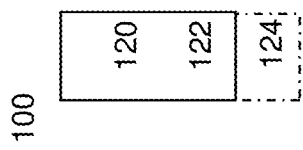
FIG. 4, showing an exemplary allocating radio node.

FIG. 4 schematically show an allocating radio node 100, which may in particular be implemented as a network node 100, for example an eNB or gNB or similar for NR. Allocating radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating an allocating radio node disclosed herein; in particular, it may comprise corresponding circuitry, e.g. processing circuitry, and/or modules. The antenna 124 circuitry may be connected to and/or comprise an antenna array. The node 100, respectively its circuitry, may be adapted to transmit configuration data and/or to configure a radio node like terminal or UE as described herein.

FIG. 5 shows an algorithmic diagram of an exemplary method of operating a radio node, which may be any of the (allocated) radio nodes described herein. The method may comprise an action TS10 of communicating utilizing frequency resources as described herein.

Figure 6:
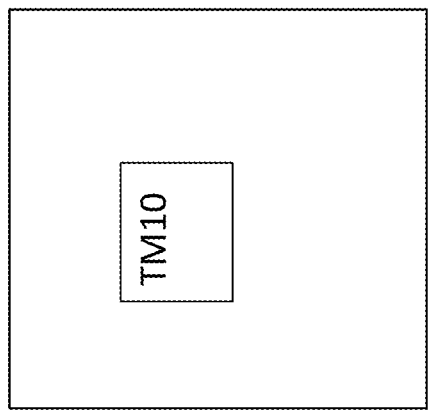
FIG. 6, showing an exemplary radio node.

FIG. 6 shows an exemplary radio node, which may be any of the (allocated) radio nodes described herein. The radio node comprises a communicating module TM10 for performing action TS10.

FIG. 7 shows an algorithmic diagram of an exemplary method of operating an allocating radio node, which may be any of the allocating radio nodes described herein. The method may comprise an action NS10 of transmitting a message comprising allocation information as described herein.

FIG. 8 shows an exemplary allocating radio node, which may be any of the allocating radio nodes described herein. The radio node comprises a transmitting module NM10 for performing action NS10.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular acknowledgement signaling, may comprise a plurality of signals and/or messages, which may be transmitted on different carriers and/or be associated to different acknowledgement signaling processes, e.g. representing and/or pertaining to one or more such processes. An indication, may comprise signaling and/or a plurality of signals and/or messages and/or may be comprised therein, which may be transmitted on different carriers and/or be associated to different acknowledgement signaling processes, e.g. representing and/or pertaining to one or more such processes.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. Header information and/or mapping information may be considered examples of explicit indications.

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to transmission from on terminal to another. Uplink, downlink and sidelink (e.g., sidelink transmission and reception) may be considered communication directions.

Signaling may generally comprise one or more signals and/or one or more symbols. Reference signaling may comprise one or more reference signals or symbols.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel.

Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Control information may in particular pertain to information indicating resources, e.g. resources (one or more thereof), which may be allocated or scheduled resources, in particular allocated to or scheduled for a device intended as target of the control information, like a terminal or UE. Such control information may also be referred to as allocation information. The resources may in particular comprise frequency resources, e.g. for uplink and/or downlink and/or sidelink, and/or time domain resources, and/or power resources (e.g., in the context of power control, in particular transmission power control) and/or code resources. Control information may indicate a modulation and/or coding scheme (MCS) used for transmission, e.g. to enable decoding of transmissions to be received, and/or to use for transmission by the device receiving the control information, e.g. for uplink or sidelink transmission. Downlink control information may in particular allocate resources for a target (e.g., a radio node) like a UE or terminal, in particular resources for downlink communication (reception of downlink transmission/s or data) and/or for uplink communication (transmission of uplink transmission/s or data) and/or for sidelink communication (transmission and/or reception of sidelink transmission/s or data).

For allocation of resources in different communication directions, different messages, in particular, different downlink control messages may be used. However, there may be considered cases in which one message indicates allocation of resources for at least two directions, e.g. uplink and downlink, or sidelink transmission and reception, etc. Different resource groupings allocated in the same message may be allocated for different directions. A message may be considered to allocate a resource grouping, if it indicates that the resource grouping (e.g., in a specific location or part of the bandwidth) is allocated and/or comprises resources for communicating by the radio node.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

Allocation information may pertain to a specific bandwidth and/or carrier and/or carrier aggregation, e.g. directly or in the context of a bandwidth representation and/or virtual-to-physical mapping. A bandwidth may pertain to the carrier or carriers of the aggregation.

A resource generally may represent a time-frequency resource, on which signaling, e.g. according to a specific format, may be communicated, for example transmitted and/or received, and/or be intended for transmission and/or reception.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK | Acknowledgment |
| ARI | ACK/NACK Resource Indicator |
| CCE | Control Channel Element |
| DCI | Downlink Control Information |
| DL | Downlink |
| DTX | Discontinues Transmission |
| HARQ | Hybrid Automatic Repeat Request |
| MIMO | Multiple Input Multiple Output |
| NACK | Negative Acknowledgment |
| OFDM | Orthogonal Frequency Division Multiplexing |
| PAPR | Peak to Average Power Ratio |
| PDCCH | Physical Downlink Control Channel |
| PUCCH | Physical Uplink Control Channel |
| RE | Resource Element |
| RB | Resource Block |
| RBG | Resource Block Group |
| RRC | Radio Resource Control |
| SC-FDM | Single-Carrier Frequency Division Multiplexing |
| Sl | Sidelink |
| UL | Uplink |

The invention claimed is:

1. A method of operating a user equipment (UE) in a New Radio (NR) Radio Access Network, the method comprising:
   transmitting uplink data utilizing allocated frequency resources based on allocation information received in a Downlink Control Information (DCI) message having an allocation information structure comprising a bit-map of B bits containing mapping information, the frequency resources being in a bandwidth of N resource blocks in frequency domain for transmitting the uplink data, the bandwidth being a specific part of the carrier bandwidth configured to the UE, the mapping information pertaining to the specific part of the carrier bandwidth;
   a resource block group (RBG) size R in frequency domain being associated to the specific part of the carrier bandwidth, R representing the number of resource blocks in an RBG, R being dependent on the specific part of the carrier bandwidth configured to the UE, R having a value of a power of 2, R being associated to the specific part of the carrier bandwidth according to a configured scheme, and R being an element of a set of RBG sizes, the RBG sizes of the set relating to each other according to a power of 2; and
   each bit of the B bits of the bit map being mapped to a different RBG of size R to indicate whether the RBG is allocated as frequency resource for transmission or not.

2. The method according to claim 1, wherein different values of R are associated with different DCI messages.

3. The method according to claim 1, wherein R is different from a size of RBGs used for allocation of frequency resources for reception of downlink communication.

4. The method according to claim 1, wherein the allocation information structure comprises a header containing header information of M bits, the header information indicating the specific part of the carrier bandwidth to which the mapping information pertains.

5. The method according to claim 4, wherein the header implicitly indicates R.

6. The method according to claim 5, wherein each specific part of the carrier bandwidth of a set of specific parts of the carrier bandwidth is represented by a possible bit combination of the header.

7. The method according to claim 6, wherein R is implicitly linked to the bit combination of the header.

8. A user equipment (UE) for a New Radio (NR) Radio Access network, the user equipment comprising processing circuitry and radio circuitry, and being configured to utilize the processing circuitry and radio circuitry to:
- transmit uplink data utilizing allocated frequency resources based on allocation information received in a Downlink Control Information (DCI) message having an allocation information structure comprising a bit-map of B bits containing mapping information, the frequency resources being in a bandwidth of N resource blocks in frequency domain for transmitting the uplink data, the bandwidth being a specific part of the carrier bandwidth configured to the UE, the mapping information pertaining to the specific part of the carrier bandwidth;
- a resource block group (RBG) size R in frequency domain being associated to the specific bandwidth part, R representing the number of resource blocks in an RBG, R being dependent on the specific part of the carrier bandwidth configured to the UE, R having a value of a power of 2, R being associated to the specific part of the carrier bandwidth according to a configured scheme, and R being an element of a set of RBG sizes, the RBG sizes of the set relating to each other according to a power of 2; and
- each bit of the B bits of the bit map being mapped to a different RBG of size R to indicate whether the RBG is allocated as frequency resource for transmission or not.

9. The user equipment according to claim 8, wherein different values of R are associated with different DCI messages.

10. The user equipment according to claim 8, wherein R is different from a size of RBGs used for allocation of frequency resources for reception of downlink communication.

11. The user equipment according to claim 8, wherein the allocation information structure comprises a header containing header information of M bits, the header information indicating the specific part of the carrier bandwidth to which the mapping information pertains.

12. The user equipment according to claim 11, wherein the header implicitly indicates R.

13. The user equipment according to claim 12, wherein each specific part of the carrier bandwidth of a set of specific parts of the carrier bandwidth is represented by a possible bit combination of the header.

14. The user equipment according to claim 13, wherein R is implicitly linked to the bit combination of the header.

* * * * *

UNITED STATES PATENT AND TRADEMARK OFFICE
CERTIFICATE OF CORRECTION

PATENT NO. : 10,574,420 B2
APPLICATION NO. : 16/402431
DATED : February 25, 2020
INVENTOR(S) : Parkvall et al.

Page 1 of 1

It is certified that error appears in the above-identified patent and that said Letters Patent is hereby corrected as shown below:

In the Specification

In Column 3, Line 57, delete "RAN)" and insert -- RAN --, therefor.

In Column 4, Line 63, delete "elements)" and insert -- elements --, therefor.

In Column 6, Line 30, delete "ceil(N/R)." and insert -- cell(N/R). --, therefor.

In Column 9, Line 43, delete "assumptions" and insert -- assumptions: --, therefor.

In Column 9, Line 65, delete "B=ceil(N/R)" and insert -- B=cell(N/R) --, therefor.

In Column 10, Line 32, delete "RIR," and insert -- R/R, --, therefor.

In Column 20, Line 9, delete "Discontinues Transmission" and insert -- Discontinuous transmission --, therefor.

Signed and Sealed this
Eighth Day of December, 2020

Andrei Iancu
*Director of the United States Patent and Trademark Office*